May 22, 1928. Re. 16,973

J. LINDBURG

TYPEWRITING MACHINE

Original Filed March 21, 1924

Inventor:
Joseph Lindburg
by B. B. Stickney
Attorney.

Reissued May 22, 1928. Re. 16,973

UNITED STATES PATENT OFFICE.

JOSEPH LINDBURG, OF BROOKLYN, NEW YORK, ASSIGNOR TO UNDERWOOD ELLIOTT FISHER COMPANY, OF NEW YORK, N. Y., A CORPORATION OF DELAWARE.

TYPEWRITING MACHINE.

Original No. 1,600,235, dated September 21, 1926, Serial No. 700,809, filed March 21, 1924. Application for reissue filed May 27, 1927. Serial No. 194,831.

This invention relates to improvements in card-holding bars for use on platens of typewriting machines for holding the leading edge of a card to the platen.

One of the objects of the invention is to improve and simplify means for attaching and locking the card-holding bar to platens of usual construction, and for unlocking the same by a simple motion of the hand.

Another feature is the provision of means for lifting the card-holding bar from the surface of the platen by the motion of unlocking it, for conveniently removing the bar from the platen.

Other features and advantages will hereinafter appear.

In the accompanying drawings.

Figure 1:
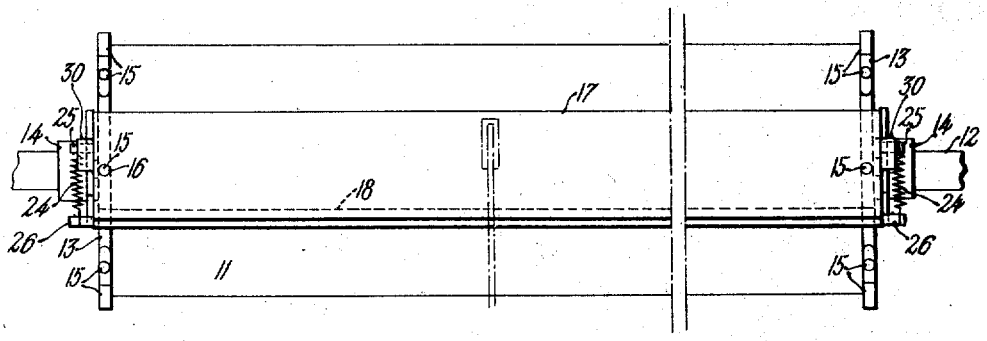
Figure 1 is a front elevation of the platen, showing the card-holding bar in front of the platen.

11 designates the platen of a typewriting machine, which is mounted on the shaft 12 thereof by means of end disks 13, which are secured to the platen. The disks 13 have thereon the usual hubs 14 to fit the shaft 12, to which said hubs may be secured in any suitable manner.

Each of said disks 13 is also provided at the periphery thereof with pin-shaped teeth 15 to fit circular apertures 16 in the main body of the card-holding bar 17 near the ends thereof.

Figure 3:
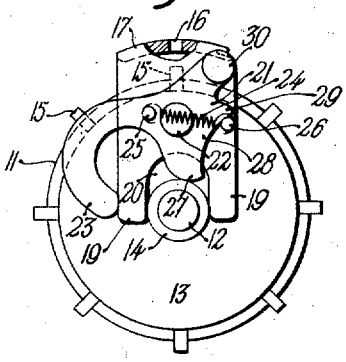
Figure 3 is a similar end view, showing the platen after it has been revolved into a position having the card-holding bar at the top thereof with the attaching means unlocked and the bar lifted from the surface of the platen.
Figure 2:
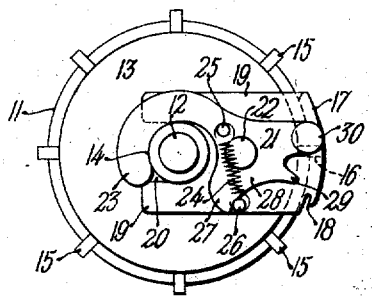
Figure 2 is an end view looking from left to right in Figure 1, showing the attaching means as locked in position.

The card-holding bar 17 is shown in Figures 2 and 3 as curved transversely thereof to fit the surface of the platen 11, and the front edge of said bar 17 is shown in Figures 1 and 2 as having therein a groove 18, to receive the leading edge of a card on the platen 11.

The ends of said bar 17 extend beyond the disks 13 and terminate in the sides 19, which extend at right angles to the main body of the bar 17 towards the center of the platen. The sides 19 of said bar 17 have therein the slots 20 to straddle the hubs 14 of said disks 13, which hubs 14 are thereby made to cooperate with said teeth 15 to keep the bar 17 in position on the surface of the platen 11.

To prevent the sides 19 of the bar 17 from being displaced outwardly in a radial direction with relation to the platen 11, thereby lifting the bar 17 therefrom, locking arms or latches 21 are provided which are pivotally connected at 22 to the sides 19 of the bar 17, each at a point near the periphery of the platen 11. Said latches 21 terminate in hooks 23, to embrace two hubs 14 on the sides thereof remote from and at points thereof substantially opposite to the main body of the bar 17 and the connections thereof with said teeth 15, as hereinbefore described.

To prevent accidental displacement of said latches 21, springs 24 are provided, which are shown as connected each at one end thereof to a pin 25 on said latches, and at the other end to a pin 26 on said sides 19.

To lift the bar 17 from the surface of the platen 11 preliminary to removing the bar therefrom, cams 27 are provided on extensions 28 of said latches 21 near the inner ends of said hooks 23. By turning said latches 21 on their pivots 22 in a clockwise direction in Figure 2, the cams 27 are brought into engagement with the periphery of the hubs 14, thereby causing the pivots 22 to move the bar 17 on said teeth 15 in a radial direction with relation to the platen, thereby disengaging the bar 17 from said teeth, and a continued motion of said cams 27 lifts the bar 17 to a position such as shown in Figure 3, when it may conveniently be removed from the platen, if necessary.

The teeth 15, to fit the apertures 16, are provided all around the periphery of the end disks 13, whereby the bar 17 may be conveniently attached to any part of the platen and locked into position thereon by said latches 21, as hereinbefore described.

To limit the outward swinging of the latches 21 on their pivots 22 when removing the bar 17 from the platen 11, stops 29 are provided on said latches 21 to be intercepted by the pins 26, as shown in Figure 3.

At Figure 2 the lock is held effectively closed by means of the spring 24. Releasing movement of the latch (effected by its fingerpiece 30) is opposed by the tension of said spring. When the latch is wide open, Figure 3, the direction of the tension of the spring is about diametrical to the pivot 22, or the spring is at dead point, or a trifle beyond the dead point as shown, whereby the latch stands ineffectively open. In other words, the latch is mechanically maintained in either closed or open position for the convenience of the operator. The stop 29 limits the opening swing of the latch, which need not turn much, if any, beyond the dead center position of the spring.

In operation, to release either end of the card-holding bar 17, finger-piece 30 may be swung in clockwise direction from Figure 2 position, thereby disengaging hook 23 from hub 14 against the tension of spring 24, thus freeing this end of the card-holding bar for removal from the platen, or for lifting off either end of the bar from the platen, for the insertion of a card, while the other end of the card-holder remains fixed to the platen.

It will be seen at Figure 3 that the finger-piece 30 can swing much farther than is required for clearing the hook 23 from the hub 14, and that during such additional swinging movement the cam 27, working on the surface of the hub 14, cams this end of the bar 17 off from the platen. This camming motion is constantly resisted by the spring 24, so that, if the finger-piece 30 were to be released at an early stage, said spring 24 would swing the hook 23 right back again to its original locking position beneath the platen-hub 14.

The stop 26, it will be noted, is so placed as to arrest the swinging of the hook by the finger-piece 30 at a point when the spring is about dead relatively to pivot 22. At this time, Figure 3, the cam 27 has ridden far enough up along the crown of the hub 14 to be able to afford an auxiliary support for the raised end of the card-holder bar 17, whereby the latter will not drop to the platen while one card is being removed and another inserted between the same and the platen. After the insertion of a new card, however, the raised end of the bar 17 may be pressed directly down, enough pressure being applied thereto to overcome the slight friction of the cam 27 working upon one side of the crown portion of the hub 14, and said downward or radial pressure upon said bar will force the forked side 19 downwardly, against the slight tension (if any) of the dead spring 24. The consequent swinging of the hook 23 about pivot 22 carries the spring end 25 also downwardly about pivot 22, while the other end 26 of the spring remains unchanged, and eventually the spring thus gains such leverage that it has power enough to close the hook to the Figure 2 position. Hence, after the end of the bar has been lifted and the typed card withdrawn and another inserted, it is only necessary to press down the released end of the bar 17, whereupon the spring 24 will relock the hook to the hub 14.

It will be noted that, when swinging the finger-piece 30 from the Figure 2 position so as to clear the hook 23 from the hub 14, as aforesaid, sufficient additional movement must be given to the hook by means of said finger-piece 30 to swing the device to its cocked Figure 3 position, with the spring 24 standing at the dead point and the cam 27 riding upon one side of the crown of hub 14; whereby a subsequent downward pressure applied upon the end of the bar 17 will be all that is required in restoring the parts to the Figure 2 position.

When it is desired to attach the bar to the platen, it is only necessary to open both hooks 23 by means of the finger-pieces 30 as far as they will go; in which position they will remain, owing to the dead positions of the springs 24. Then the forked ends of the sides 19 are straddled over the hubs 14 at the ends of the platen. Then the ends of the bar 17 are pressed down onto the platen, the springs 24 being caused by such pressure to act to finally close the hooks around the hubs 14.

Variations may be resorted to within the scope of the invention, and portions of the improvements may be used without others.

Having thus described my invention, I claim:

1. The combination of a platen of a typewriting machine, an end disk secured to the platen, radially-disposed pin-shaped teeth on the periphery of said disk, a card-holding bar, an aperture in the main body thereof, interchangeably to engage said teeth, the end of said bar terminating in a side extending substantially at right angles to the main body of said bar, and means for removably engaging said side with a part of the platen substantially in line with the tooth in said aperture, thereby detachably connecting said bar to the platen.

2. The combination of a platen of a typewriting machine, an end disk secured to the platen, radially-disposed pin-shaped teeth on the periphery of said disk, a card-holding bar, an aperture in the main body thereof, interchangeably to engage said teeth, the end of said bar terminating in a side extending substantially at right angles to the main body of said bar, a slot in said side, radially disposed with relation to said disk and platen, and a cylindrical portion extending coaxially with said disk and platen, to fit said slot, thereby co-operating with the tooth in said aperture to detachably connect said bar to the platen.

3. In a typewriting machine, the combination with a revoluble platen, of a card-holding bar extending along the platen, said bar having its ends directed inwardly toward the platen-shaft, adjacent the ends of the platen and terminating in forks for engagement around said platen-shaft, and releasable members carried by said ends of the bar including hooks for engaging around said platen-shaft between the tines of the forks whereby the bar is secured to the platen.

4. The combination of a platen of a typewriting machine, a card-holding bar terminating at its end in a side extending substantially at right angles to the main body thereof, a slot in said side radially disposed with relation to said platen, a cylindrical portion extending coaxially with said platen to fit said slot, means for co-operating with said portion in said slot to detachably connect said bar to the platen, and a cam pivotally connected to said side to react on said portion, thereby displacing said side radially with relation to said platen, and thereby lifting the main body of said bar from the surface of the platen.

5. The combination of a platen of a typewriting machine, a card-holding bar terminating at its end in a side extending substantially at right angles to the main body thereof, a slot in said side radially disposed with relation to said platen, a cylindrical portion extending coaxially with said platen to fit said slot, means for co-operating with said portion in said slot to detachably connect said bar to the platen, a latch to prevent accidental displacement of said side in a radial direction with relation to said platen, pivotally connected to said side, and a cam on said latch to react on said portion when opening said latch, thereby displacing said latch radially with relation to said platen, and thereby lifting the main body of said bar from the surface of the platen.

6. In a typewriting machine, the combination with a revoluble platen, of a card-holding bar extending therealong, the ends of the bar being turned inwardly toward the platen-shaft adjacent the ends of the platen and formed with forks for engagement around said platen-shaft, and releasable hooks pivoted to said ends of the bar for engagement around the platen-shaft between the tines of the forks, whereby to secure the bar to the platen-shaft, said hooks each including a cam co-acting against the platen-shaft during the act of releasing the bar from the platen, whereby the cams raise the bar from the platen.

7. The combination of a platen of a typewriting machine, a pair of end disks secured to the platen, hubs on said disks at the center thereof, pin-shaped teeth on the periphery of each of said disks, a card-holding bar to fit the surface of the platen, a pair of apertures in the main body of said bar, interchangeably to engage said teeth, the ends of said bar terminating in sides extending substantially at right angles to the main body thereof, and slots in said sides radially disposed with relation to said disks and said platen, to fit said hubs, thereby co-operating with said teeth in said apertures to detachably connect said bar to the platen.

8. In a typewriting machine, the combination with a platen, of a card-holding bar extending along the platen, the ends of said bar being turned inwardly toward the platen-shaft, adjacent the ends of the platen, and releasable means for securing said ends to the platen-shaft, said means including a cam engageable with said platen-shaft, whereby, upon actuating said securing means to release the bar, the cam is effective to raise the bar from the platen.

9. In a typewriting machine, the combination with a platen, of a card-holding bar extending along the platen and having a perforation therein, a series of pins disposed around the platen and engageable selectively with said perforation for holding the platen against angular displacement, and releasable means for securing the bar to the platen including a cam engageable with the platen, whereby, upon actuating said securing means to release the bar, the cam coacts against the platen to raise said bar from the pins.

10. In a typewriting machine, the combination with a platen, of a card-holding bar extending along the platen, means disposed around the platen and engageable selectively with the bar, whereby said bar is held against angular displacement in any selected position around the platen, and releasable means for securing the bar to the platen, said means being effective to free the bar from said selective holding means during the act of releasing the bar from the platen.

11. Mechanism as set forth in claim 4, in which said connecting means includes a spring, said cam operating against the tension of said spring.

12. Mechanism as set forth in claim 4, in which said connecting means includes a spring, said cam operating against the tension of said spring, a finger-piece upon the cam capable of swinging the cam to bring the spring to dead position, and a stop to arrest said cam with the spring in said dead position and with the cam resting upon the side of the crown of said cylindrical portion.

13. In a typewriting machine, the combination with a revoluble platen, of a card-holding bar extending along the platen and having ends extending inwardly and supported by the platen-shaft, one of said ends being forked to bestride the platen-shaft, a spring, and locking means holdable in idle open position by the spring, but operable by pressure applied upon the end of said bar in a direction radial to the platen, for causing the spring to lock said fork to the shaft.

14. Mechanism as set forth in claim 13, in which said locking means includes a hook pivoted to said end of said bar and provided with a finger-piece, a cam upon said hook, said spring working between said end and said cam and tensioned by the opening of said hook and brought to dead position thereby, so that the hook stands open with the cam resting upon the side of the crown of the platen-shaft, and so that pressure upon the bar is effective upon the cam to cause it to work off from the platen-shaft and bring said spring to active position to close the hook around the shaft.

15. In a typewriting machine, the combination with a revoluble platen and its shaft, of a work-holding bar extending along the platen and means securing the bar at its end to the platen, including a lock device to hook under the platen-shaft, a spring to hold said lock closed, and means to cock said device in open position, said locking device being releasable from its cocked position by pressure applied upon the end of the bar to press it in a direction towards the platen-shaft, and said spring being effective to effect the locking engagement of the released locking device to the platen-shaft.

JOSEPH LINDBURG.